March 6, 1962
R. F. NIXON
3,024,032
QUICK CHANGE TOOL HOLDER
Filed Oct. 18, 1960
3 Sheets-Sheet 1
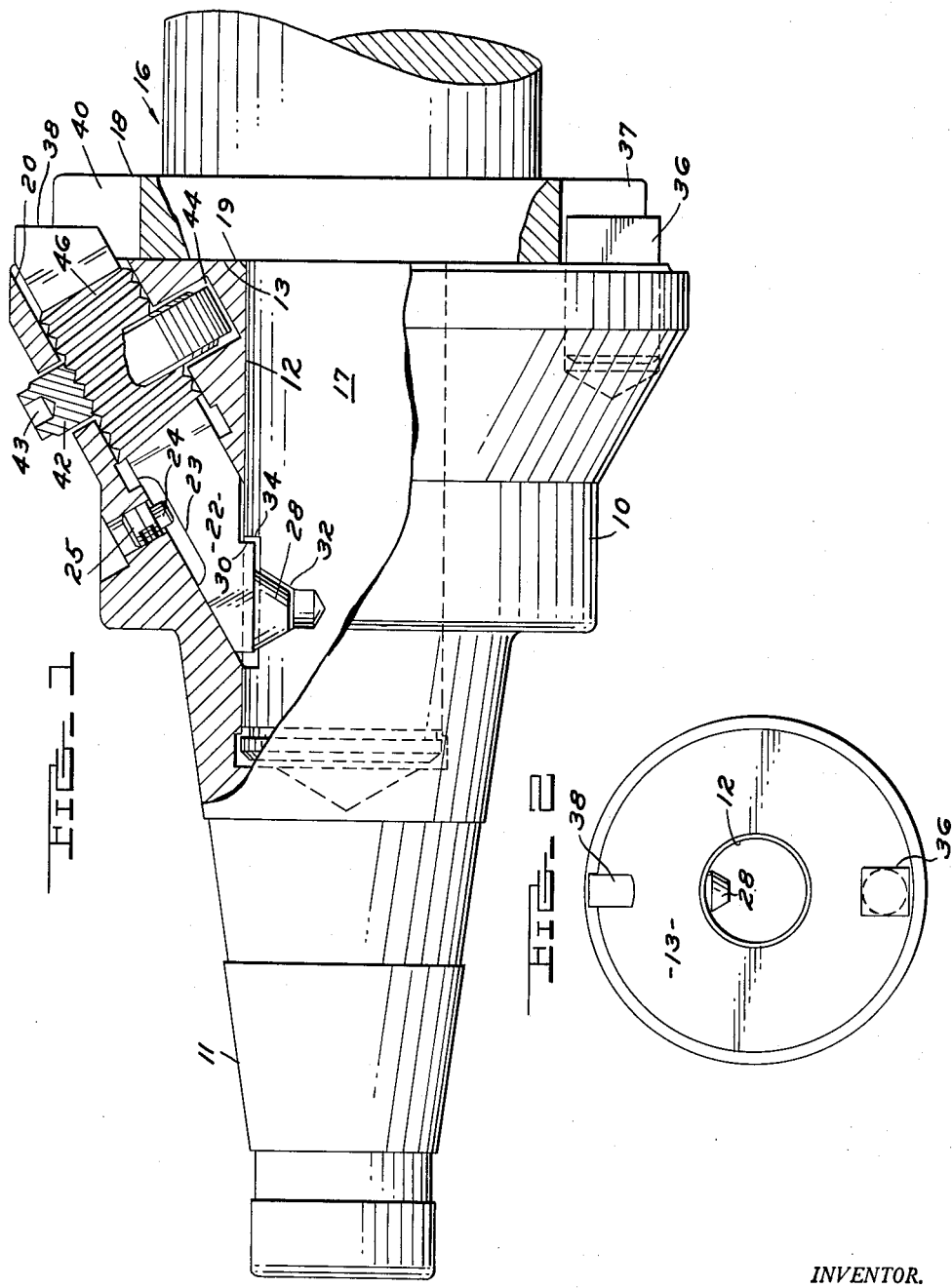
INVENTOR.
RAYMOND F. NIXON
BY
Farley Forster & Farley
ATTORNEYS

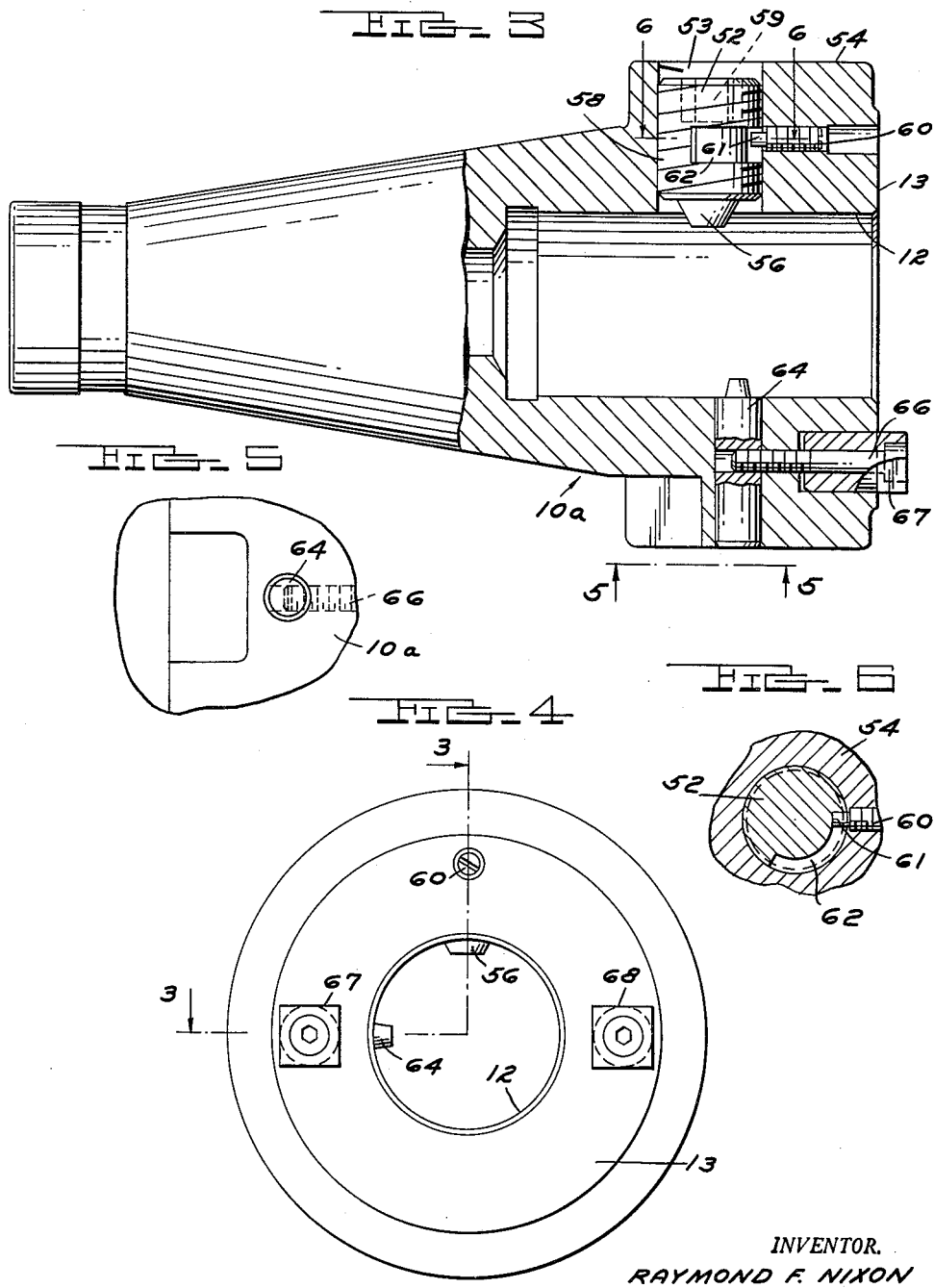

March 6, 1962
R. F. NIXON
3,024,032
QUICK CHANGE TOOL HOLDER
Filed Oct. 18, 1960
3 Sheets-Sheet 3
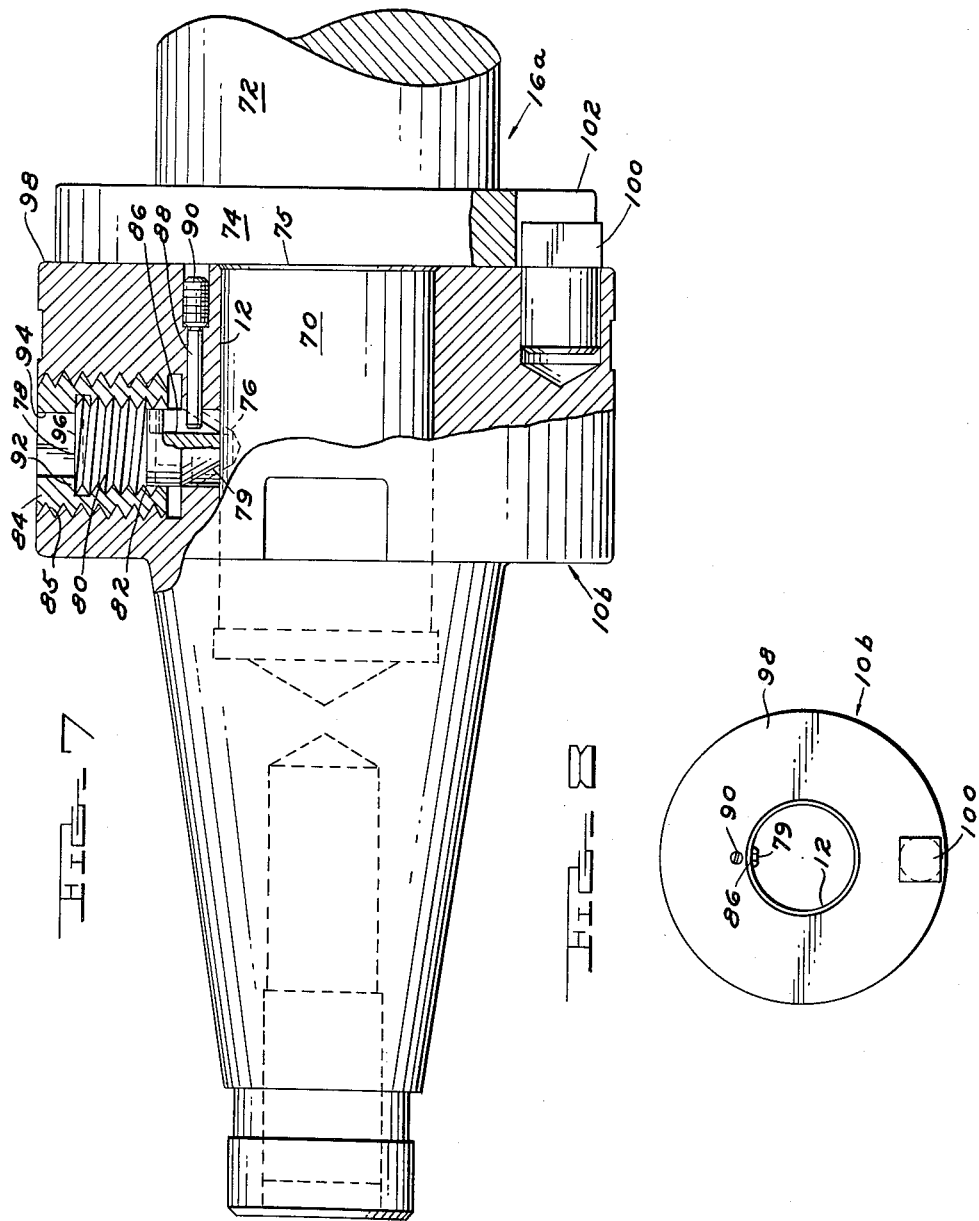
INVENTOR.
RAYMOND F. NIXON
BY
Farley, Forster & Farley
ATTORNEYS United States Patent Office 3,024,032
Patented Mar. 6, 1962

3,024,032
QUICK CHANGE TOOL HOLDER
Raymond F. Nixon, Bloomfield Hills, Mich., assignor to Beaver Tool & Engineering Corporation, a corporation of Michigan
Filed Oct. 18, 1960, Ser. No. 63,445
14 Claims. (Cl. 279—81)

This invention relates to an improved construction for a tool holder of the type used on the spindle of a machine for mounting a cutting tool element, and this application is a continuation-in-part of my co-pending application Serial No. 769,427, filed October 24, 1958, now abandoned.

The improvements of the invention are directed to providing a tool holder in which a cutting tool element— either a cutting tool itself or an adapter for mounting the cutting tool—can be quickly positioned in one defined relationship between the tool element and the holder. In other words, the position of the tool element in the tool holder is defined both radially and longitudinally with respect to the tool holder axis. With this type of holder construction, tool elements can be quickly inserted in the holder and removed from the holder for replacing cutting tools, changing from one cutting tool to another and interchanging cutting tools between a plurality of holders, all with a degree of accuracy limited only by manufacturing tolerances of the parts themselves.

The present invention is particularly directed to improvements over the type of tool holder construction illustrated in U.S. Patent 2,384,600. These improvements result in simplified construction which materially reduces the manufacturing cost of a holder of this type and which results in improved operation for quickly positioning and positively locking a tool element in the holder and for withdrawing a tool holder therefrom.

In general, the improved construction includes, in a holder of the type having a body portion with a socket formed therein for close fitting engagement by the shank of a tool element, an improved means for rapidly locking the tool element shank in the socket and releasing the shank for removal of the tool element from the holder. The improved means comprises a locking recess formed on the tool element shank which is engageable by a locking projection on a locking member mounted in a bore in the tool holder body and extending between the holder socket and an outer surface of the holder body. The holder is provided with means for locating the tool element shank in the holder socket in a position where the locking recess is aligned with the locking projection. The holder further includes double thread means for moving the locking member inwardly and outwardly in the bore to engage and disengage the locking projection from the recess of the tool element. This thread means is self-locking and capable of moving the locking member between engaged and disengaged positions with a fraction of a turn of thread movement, preferably on the order of one-half turn or less. In other words, the thread means has an effective pitch equal to the extent of such locking member movement multiplied by the reciprocal of the number of turns desired to produce the same, and, the thread means also has a locking lead angle not in excess of approximately seven degrees.

Two general types of double thread construction having these characteristics are disclosed and will be described. In one type a threaded portion is formed on the locking member consisting of a double-start thread having a pitch, for example, on the order of twice the extent of the engagement of the locking projection in the recess of the tool element, and having a pitch diameter such that this double-start thread is formed with a locking lead angle not in excess of approximately seven degrees. In the other type of construction, a threaded locking member is mounted in an internally threaded sleeve which in turn is threaded into the body of the tool holder, the locking member being held against rotation relative thereto. A differential thread arrangement is thereby formed having an effective pitch which is the combination of the pitch of the thread on the locking member and the pitch of the thread between the sleeve and the tool holder. This effective pitch has the characteristics described above and each thread has a locking lead angle such as described above.

Either type of construction permits the locking member to be moved to or from engaged position with an amount of rotation on the order of one-half a revolution or less; and when the locking member of each type of construction is in engaged position with the tool element, a self-locking wedging action is obtained from the thread means thereof which tends to be increased when the holder is rotated with the spindle of a machine.

Other features and advantages of the invention will be brought out in connection with the following description of the representative constructional examples shown in the accompanying drawings which comprise the following views:

FIGURE 1, a side elevation of a tool holder shown partly in section to illustrate the locking member of the construction in engagement with the shank of a tool element;

FIGURE 2, an end elevation of the tool holder of FIGURE 1 with the tool element removed from the socket thereof;

FIGURE 3, a side elevational view of an alternate construction which is shown partly on a section taken on the line 3—3 of FIGURE 4;

FIGURE 4, an end elevation of the construction shown in FIGURE 3;

FIGURE 5, a plan detail view taken as indicated by the arrows 5—5 of FIGURE 3;

FIGURE 6, a sectional detail taken on the line 6—6 of FIGURE 3;

FIGURE 7, a side elevation partly in section of an alternate form of construction and including a portion of a tool element mounted in the holder; and FIGURE 8, an end elevation on a reduced scale of the tool holder of FIGURE 7 with the tool element removed therefrom.

Referring to FIGURES 1 and 2, the holder construction includes a body 10 generally cylindrical in shape and having a shank portion 11 which is formed to suit the characteristics of the spindle on which the holder is to be used. A cylindrical socket 12 is formed in the holder body, this socket extending inwardly from the outer end face 13 of the holder body on the longitudinal axis thereof. End face 13 is ground perpendicular to the holder axis.

A tool element 16 is illustrated. This element may be some form of cutting tool or an adapter on which a cutting tool is mounted. Tool element 16 is provided with a cylindrical shank 17 dimensioned for close fitting engagement in the holder socket 12 and with a flange 18 having an inner face 19 which is formed at right angles to the axis of the shank 17 for abutting engagement with the outer end face 13 of the holder body. Such abutting engagement is obtained by action of the locking element of the holder.

In FIGURES 1 and 2 the holder body is provided with a bore 20 on an axis transversely of the holder axis and which extends between the end face 13 of the holder and the socket 12. A locking member 22 is slidably mounted in the bore 20 in a position defined by engagement between a keyway 23 on the locking member and a key projection 24 on a screw 25. Locking member 22 has a locking projection 28 on its inner end and an adjacent abutment surface 30 which is directed toward the outer end 13 of the holder.

Tool element 16 has a locking recess 32 formed in the shank thereof, this recess being shaped to complement the shape of the locking projection 28 with both of these shapes preferably being frusto-conical, and formed on axes which are perpendicular to the axis of the socket 12 and tool element shank 17. The locking recess also includes an inwardly directed shoulder 34.

The locking recess 32 is located axially of the shank 17 so that when engaged by the locking projection 28 of the locking member, the flange face 19 of the tool element will be drawn into abutment with the end surface 13 of the holder body.

Means are included for defining the relative radial position of the tool element in the holder socket; these means comprising a fixed drive key 36 mounted in the holder body and projecting from the face 13 thereof. The projecting portion of the drive key is rectangular in section as can be seen in FIGURE 2. This drive key is engaged by a correspondingly dimensioned slot 37 formed in the flange 18 of the tool element. A second drive key is formed by the outer end 38 of the locking member 22 which also has a rectangular shape for engagement in a correspondingly dimensioned slot 40 in the flange 18. As can be seen in FIGURE 2, the rectangular dimensioning of the drive key 36 and end portion 38 of the locking member are different so that with corresponding dimensions for the slots 37 and 40, a tool element can only be properly mounted in the holder in one radial position, which locates the locking recess 32 of the tool element for engagement by the locking projection 28 of the locking member 22.

The extent of engagement is of course determined by the dimensioning employed for the locking recess and locking projection and for any particular design this extent of engagement will have a definite dimension.

Movement of the locking member 22 to and from an engaged position is obtained by rotation of a nut 42 provided with wrench sockets 43 and journalled in a circular recess 44 formed in the tool holder body. The nut 42 engages a threaded portion 46 formed on the locking member 22. This threaded portion preferably consists of a double-start thread having a pitch which is equal to the depth of engagement of the locking projection 28 in the locking recess 32 multiplied by the reciprocal of the desired number of revolutions to move the locking member between engaged and disengaged positions and divided by the sine of the angle between the longitudinal axis of the holder and the axis of the bore 20; and, this threaded portion is also formed on a diameter such as to enable a thread of this pitch to have a locking lead angle of approximately seven degrees or less.

When the locking member 22 is moved to disengaged position the abutment surface 30 is brought into contact with the surface 34 of the tool shank recess and surface 30 has a disengaging component of motion parallel to the axis of the holder socket 12. As a result, initial disengaging movement of the locking member 22 is accomplished by a slight axial movement of the tool element shank. This is useful in helping to free the snugly fitting shank from the tool holder socket.

Disengaging movement of the locking member 22 is limited by the length of the keyway 23 to an extent slightly in excess of that required to completely withdraw the locking projection 28 from the tool holder socket 12 so that an operator cannot turn the nut 42 more than is necessary. This insures that the speed of locking and unlocking operation will be maintained.

In the construction shown in FIGURES 3 to 6 the locking element 52 is mounted in a bore 53 which extends normal to longitudinal axis of the holder 10a between the outer circumference 54 and the socket 12 thereof. This locking member 52 is provided with a locking projection 56 and it will be understood that the tool element shank (not shown) is provided with a complementary recess. The locking member 52 includes a threaded portion 58 having the characteristics above defined, namely, that a double-start thread is used having a pitch equal to the depth of engagement multiplied by the reciprocal of the desired number of revolutions to move the locking member between engaged and disengaged positions; and a diameter such as to result in the thread having a locking lead angle of approximately seven degrees or less. A corresponding thread is formed in the bore 53 and the locking member 52 is provided with a wrench socket 59 so that it can be rotated between engaged and disengaged position. The extent of rotation is limited by some suitable means such as a stop screw 60 having an inner end 61 which projects into engagement with an arcuate slot 62 formed on the locking member. In the construction shown the thread design is such as to produce full engaging and disengaging movement within one-third turn of the locking member 52 and the slot 62 (FIGURE 6) is designed to limit rotary movement of the locking member to this amount.

Relative positioning between the tool holder and the shank of a tool element is defined by a key 64 which projects into the holder socket 12 for engagement with a longitudinal keyway formed on the shank of the tool element. Key 64 is held in position by a screw 66 which extends inwardly from the outer face 13 of the holder for mounting a drive key 67 thereon. A similar drive key 68 (FIGURE 4) is mounted diametrically opposite and these drive keys engage in slots on the flange of the tool element similar to the slots 37 and 40 shown in FIGURE 1.

The tool holder 10b shown in FIGS. 7 and 8, is provided with a socket 12 in which the shank portion 70 of a tool element 16a is mounted, this tool element including a tool carrying portion 72 and flange means 74 forming an abutment surface 75 which extends normal to the axis of the shank portion 70 at the end of the shank portion adjacent carrying portion 72. A conical locking recess 76 is formed in the shank portion 70 in precise axial dimensioning from the abutment surface 75.

A locking member 78 is mounted in the tool holder and has a conical locking portion 79 provided on the inner end thereof for engagement in the recess 76. This locking member 78 also includes a threaded portion 80 which engages internal threads 82 of a sleeve or carrier 84 having external threads 85 in turn engaging the tool holder body. The locking member 78 is held against rotation relative to the tool holder body by key and keyway means which include a keyway 86 on the locking member 78 engaging a key formed by a headed pin 88 held in a hole in the tool holder body by a screw 90.

The locking member carrier 84 has an internal shoulder 92 and a wrench socket 94, the shoulder 92 being located so that when the sleeve 84 is turned by inserting a wrench in the socket 94 to withdraw the locking member 78 from engaged to disengaged position, the outer end 96 of the locking member 78 comes into abutment against the shoulder 92 when the locking projection 79 reaches a disengaged position relative to the tool element shank 70. This prevents further rotation of the carrier 84 and hence serves as a means to automatically limit disengaging movement of the locking member 78.

A differential thread type of construction is thus provided for mounting the locking member 78 in the tool holder body and for moving it between engaged and disengaged positions of the locking portion thereof in lieu of the double-start type of thread means employed in the constructions priviously described. With the differential type of thread means the effective pitch is of course equal to the combined pitch of the internal and external threads 82 and 85 of the carrier 84, and this effective pitch is again equal to the extent of movement of the locking member 78 between engaged and disengaged position multiplied by the reciprocal of the number of turns of the carrier desired to produce such movement. The lead angle of each thread 82 and 85 is made a locking one of approximately seven degrees or less so that when the locking member 78 is moved into engagement with the recess 76 of the tool element shank, thereby drawing the abutment surface 75 into engagement with the ground outer face 98 of the holder body, the threads act to lock the locking member in this position.

The construction of the holder and tool element 16a can be further simplified by the provision of a single drive key 100 mounted on the face of the holder, preferably in 180 degree relation to the locking member 78. This drive key 100 engages a recess 102 formed in the flange 74 of the tool element 16a, and thus serves not only as a driving element but also as a means for locating the locking recess 76 of the tool element in proper position for engagement by the locking member 78. Such a single driving and locating key can of course be employed on any of the previously described constructions if desired.

It is to be noted that in all constructions the holder assembly is generally symmetrical about the holder axis and that static and dynamic balance of the assembly is not materially affected by the construction employed for locking and driving a tool element in the holder.

While preferred embodiments have been described above in detail, it will be understood that numerous modifications might be resorted to without departing from the scope of my invention as defined in the following claims.

I claim:

1. In a tool holder of the type having a body portion with a socket formed therein for close fitting engagement by a tool element shank having a locking recess formed thereon, means for rapidly locking said tool element shank in said socket and releasing said shank for removal of said tool element from said holder comprising a bore formed in said holder body and communicating with said socket, a locking member having a locking portion provided on the inner end thereof for engagement in said locking recess of said tool element shank, double thread means mounting said locking member in said bore for moving said locking member axially in said bore between engaged and disengaged positions of said locking portion thereof in said recess, said thread means having an effective pitch equal to the extent of said axial movement of said locking member in said bore multiplied by the reciprocal of the number of turns of said thread means desired to produce said movement of said locking member and a diameter such as to have a locking lead angle not in excess of approximately seven degrees.

2. A construction according to claim 1 further characterized by means for defining one position in which said tool element shank can be inserted in said tool holder socket axially and radially thereof, said axial positioning means including the outer end face of said tool holder body and a flange on said tool element shank, said radial positioning means comprising a drive key and keyway provided on said tool holder end face and said tool element flange.

3. A construction according to claim 1 wherein said double thread means comprises a double start thread formed on said locking member, said thread having a pitch equal to the extent of said locking member engaging and disengaging movement multiplied by the reciprocal of the number of turns of said thread desired to produce such movement of said locking member, and said thread further having a diameter such as to result in a locking lead angle not in excess of approximately seven degrees.

4. A construction according to claim 3 wherein said locking member is mounted in a bore inclined inwardly of said holder socket and further characterized by said means for moving said locking member in said bore including a nut journalled in said holder body and engaging said thread of said locking member.

5. A construction according to claim 4 wherein the outer end of said locking member projects outwardly of said bore and is formed with at least one key surface for driving engagement with a cooperating key surface formed on said tool element.

6. A construction according to claim 4 wherein the inner end of said locking member is provided with an abutment surface adapted to engage said tool element recess whereby movement of said locking member to disengage said locking projection from said recess will impart axial outward movement of said tool element shank in said socket.

7. A construction according to claim 1 wherein said double thread means comprises a first threaded portion on said locking member, a carrier member having an internally threaded portion engageable with said first threaded portion, a second externally threaded portion on said carrier member engageable with a corresponding internally threaded portion in said tool holder body, and key means for preventing rotation of said locking member relative to said tool holder body whereby said effective pitch is equal to the combined pitch of said first and second threaded portions.

8. A construction according to claim 1 further characterized by means for preventing movement of said locking member in a disengaging direction substantially in excess of that required for said locking member to reach a disengaged position.

9. A construction according to claim 1 wherein said double thread means comprises a first externally threaded portion formed on said locking member, a carrier member having an internally threaded portion engageable by said first threaded portion and a second externally threaded portion engaged in said tool holder body, means for rotating said carrier member, means for preventing rotation of said locking member whereby said effective pitch is equal to the combined pitch of said first and second threaded portions, and means for limiting rotation of said carrier member in a disengaging direction of movement of said locking member.

10. A construction according to claim 9 wherein said means for preventing rotation of said carrier member comprises an abutment surface formed thereon for engagement by said locking member in the disengaged position thereof.

11. A construction according to claim 1 further characterized by means for locating said tool element in said holder socket including the outer end portion of said locking member and a slot formed on said tool element for engagement therewith.

12. In a tool holder of the type having a body portion with a cylindrical socket formed therein for close fitting engagement by a cylindrical tool element shank having a locking recess formed thereon, means for quickly locking said shank in said socket in an axial position defined by abutting engagement between a flange on said tool element and the outer end surface of said tool holder body, comprising a bore formed transverse to the axis of said socket through said tool holder body between said socket and an outer surface of said body, a threaded locking member mounted in said bore, a locking projection provided on the inner end of said locking member for engagement in said locking recess, said locking projection and recess each including a tapered surface, and double thread means to produce axial movement of said locking member in said bore to engage said locking projection in said recess to an extent sufficient to draw said tool element flange into abutting engagement with said tool holder end surface and to disengage said locking projection from said recess, said thread means having an effective pitch equal to the extent of said movement of said locking member in said bore multiplied by the reciprocal of the number of turns of said thread means desired to produce said movement of said locking member and a diameter such as to have a locking lead angle not in excess of approximately seven degrees.

13. A construction according to claim 12 further characterized by means of said tool element flange and said tool holder end surface for defining one position in which said shank can be inserted in said tool holder socket in radial relation thereto.

14. For use in a tool holder of the type having a cylindrical socket, a tool element having a shank portion, a tool carrying portion, and flange means forming an abutment surface extending normal to the axis of said shank portion at the end of said shank portion adjacent said tool carrying portion, a locking recess formed on said shank portion, and locating means formed on said flange means in one radial angularly defined relation to said locking recess from the axis of said cylindrical shank portion.

References Cited in the file of this patent

UNITED STATES PATENTS

| | | |
|---|---|---|
| 2,283,514 | Stansworth | May 19, 1942 |
| 2,384,600 | Cherry | Sept. 11, 1945 |
| 2,437,740 | Haynes | Mar. 16, 1948 |